(12) United States Patent
Nguyen et al.

(10) Patent No.: US 8,360,250 B2
(45) Date of Patent: Jan. 29, 2013

(54) SELF-CLEANING VALVE

(75) Inventors: Quynh Nguyen, Montclair, CA (US); Huong Tran, Corona, CA (US)

(73) Assignee: The Toro Company, Bloomington, MN (US)

( * ) Notice: Subject to any disclaimer, the term of this patent is extended or adjusted under 35 U.S.C. 154(b) by 731 days.

(21) Appl. No.: 12/326,627

(22) Filed: Dec. 2, 2008

(65) Prior Publication Data

US 2009/0145486 A1    Jun. 11, 2009

Related U.S. Application Data

(60) Provisional application No. 61/012,190, filed on Dec. 7, 2007.

(51) Int. Cl.
*B01D 35/16* (2006.01)
*F16K 31/40* (2006.01)

(52) U.S. Cl. ......... 210/355; 210/415; 137/242; 137/549

(58) Field of Classification Search .................. 137/242, 137/544, 549; 210/355, 413–415, 429–432
See application file for complete search history.

(56) References Cited

U.S. PATENT DOCUMENTS

| | | | | |
|---|---|---|---|---|
| 664,833 | A | * | 1/1901 | Collins .................. 210/355 |
| 954,313 | A | * | 4/1910 | Lillyman ................ 210/136 |
| 3,357,567 | A | | 12/1967 | Wake |
| 3,550,775 | A | | 12/1970 | Cooley |
| 3,623,607 | A | | 11/1971 | Loos |
| 3,653,348 | A | | 4/1972 | Baumhaft |
| 3,754,651 | A | | 8/1973 | Lannoch |
| 3,850,802 | A | | 11/1974 | Berger |
| 3,959,140 | A | | 5/1976 | Legras |
| 4,003,837 | A | | 1/1977 | Osborne |
| 4,019,984 | A | | 4/1977 | Mohn |
| 4,039,452 | A | | 8/1977 | Fernandez |
| 4,045,345 | A | | 8/1977 | Drori |
| 4,060,483 | A | | 11/1977 | Barzuza |
| 4,081,171 | A | | 3/1978 | Morgan et al. |
| 4,217,116 | A | | 8/1980 | Seever |
| 4,235,414 | A | * | 11/1980 | Lis .................................. 251/24 |
| 4,271,018 | A | | 6/1981 | Drori |
| 4,278,540 | A | | 7/1981 | Drori |
| 4,337,158 | A | | 6/1982 | Bodine |
| 4,360,037 | A | | 11/1982 | Kendall |
| 4,655,910 | A | | 4/1987 | Tabor |
| 4,655,911 | A | | 4/1987 | Tabor |
| 4,818,402 | A | | 4/1989 | Steiner et al. |
| 4,919,801 | A | | 4/1990 | Hobson, Jr. |
| 5,074,999 | A | | 12/1991 | Drori |
| 5,192,429 | A | | 3/1993 | Bader |
| 5,213,303 | A | | 5/1993 | Walker |
| 5,228,993 | A | | 7/1993 | Dori |
| 5,312,544 | A | | 5/1994 | Kinney |
| 5,389,243 | A | | 2/1995 | Kaplan |
| 5,401,396 | A | | 3/1995 | Lescovich et al. |
| 5,560,820 | A | | 10/1996 | Consolo |
| 5,584,314 | A | | 12/1996 | Bron |

(Continued)

FOREIGN PATENT DOCUMENTS

EP    1 245 258 A2    10/2002
JP    2000-256493 A    9/2000

*Primary Examiner* — Terry Cecil
(74) *Attorney, Agent, or Firm* — Inskeep IP Group, Inc.

(57) ABSTRACT

An elongated filter disposed over a metering passage of a valve. A rotor is rotatably mounted over the filter and includes a scraping surface positioned along the length of the filter. As water enters the valve, the rotor rotates, causing the scraping surface to scrape off any debris along the length of the filter.

18 Claims, 10 Drawing Sheets

U.S. PATENT DOCUMENTS

| | | |
|---|---|---|
| 5,670,038 A | 9/1997 | Mckinney |
| 5,804,072 A | 9/1998 | Yang |
| 5,830,347 A | 11/1998 | Vollmer |
| 5,979,304 A | 11/1999 | Norais |
| 5,996,608 A | 12/1999 | Hunter et al. |
| 6,110,388 A | 8/2000 | Norais et al. |
| 6,394,413 B2 | 5/2002 | Lohde et al. |
| 6,575,307 B2 | 6/2003 | Lockwood |
| 7,501,058 B1 * | 3/2009 | Lawrence, Sr. ............... 210/232 |
| 7,694,934 B2 * | 4/2010 | Irwin ..................... 251/30.02 |

* cited by examiner

SELF-CLEANING VALVE

RELATED APPLICATIONS

The present invention claims benefit of U.S. Provisional Application Ser. No. 61/012,190, filed Dec. 7, 2007 entitled Self-Cleaning Valve, which is incorporated herein by reference.

BACKGROUND OF THE INVENTION

Flow control valves are a well-known and integral part of most irrigation systems. A typical example can be seen in U.S. Pat. No. 6,394,413 to Lohde et al., hereby incorporated by reference.

These valves control the flow of water through an upstream pipe and thereby turn sprinklers fed by the pipe on and off. Such valves are usually remotely actuated by control signals sent from an automated irrigation controller. Often these control signals are electric current sent from the controller to a solenoid in the valve which ultimately controls whether the valve is open or closed.

Solenoid-activated diaphragm-operated valves for use in irritation systems are well known. One example can be seen in U.S. Pat. No. 6,394,413 to Lohde et al., previously incorporated by reference.

This style of valve has a closure member with a sealing surface which moves against or away from an annular seat to close or open the valve. Integral to the closure member is a diaphragm positioned to seal off an upper portion of the valve. A metering passage allows water to enter the upper portion and thereby build up pressure to maintain the closure member in a closed position.

When the valve is to be opened, the fluid pressure in the upper portion is relieved by bleeding fluid out of the diaphragm chamber through a manual valve or by a remotely operated solenoid valve. Relieving this pressure allows the closure member to move upwards as water passes through the valve. The discharged water is conveniently released into the passageway, beyond the primary flow-controlling sealing member, near the outlet port.

Over time, dirt, corrosion and other debris within the water can block or clog the metering passage. This blockage can prevent water and therefore water pressure from building up within the upper portion, thereby preventing the valve from closing.

U.S. Pat. Nos. 5,996,608 and 6,575,307 have addressed this problem by providing a longitudinally moving wiper blade to scrape off debris from a filter screen over the metering passage. The filter screen prevents debris, coarse enough to block the metering passage, from blocking the passage. However, these designs fail to effectively clean the filter screen, often passing over or further embedding the debris in the screen. Further, these prior art designs rely on movement of a scraping mechanism axially only when the valve is turned on or off, further diminishing any cleaning capability.

Therefore, what is needed is a debris-tolerant valve that can better prevent the metering passage from clogging and thereby maintain free flow through the metering passage.

OBJECTS AND SUMMARY OF THE INVENTION

It is an object of the invention to provide an improved valve that resists blocking the discharge passage.

In one preferred embodiment, the present invention includes an elongated filter disposed over a metering passage of a valve. A rotor is rotatably mounted over the filter and includes a scraping surface positioned along the length of the filter. As water enters the valve, the rotor rotates, causing the scraping surface to scrape off any debris along the length of the filter.

DETAILED DESCRIPTION OF THE INVENTION

Figure 1:
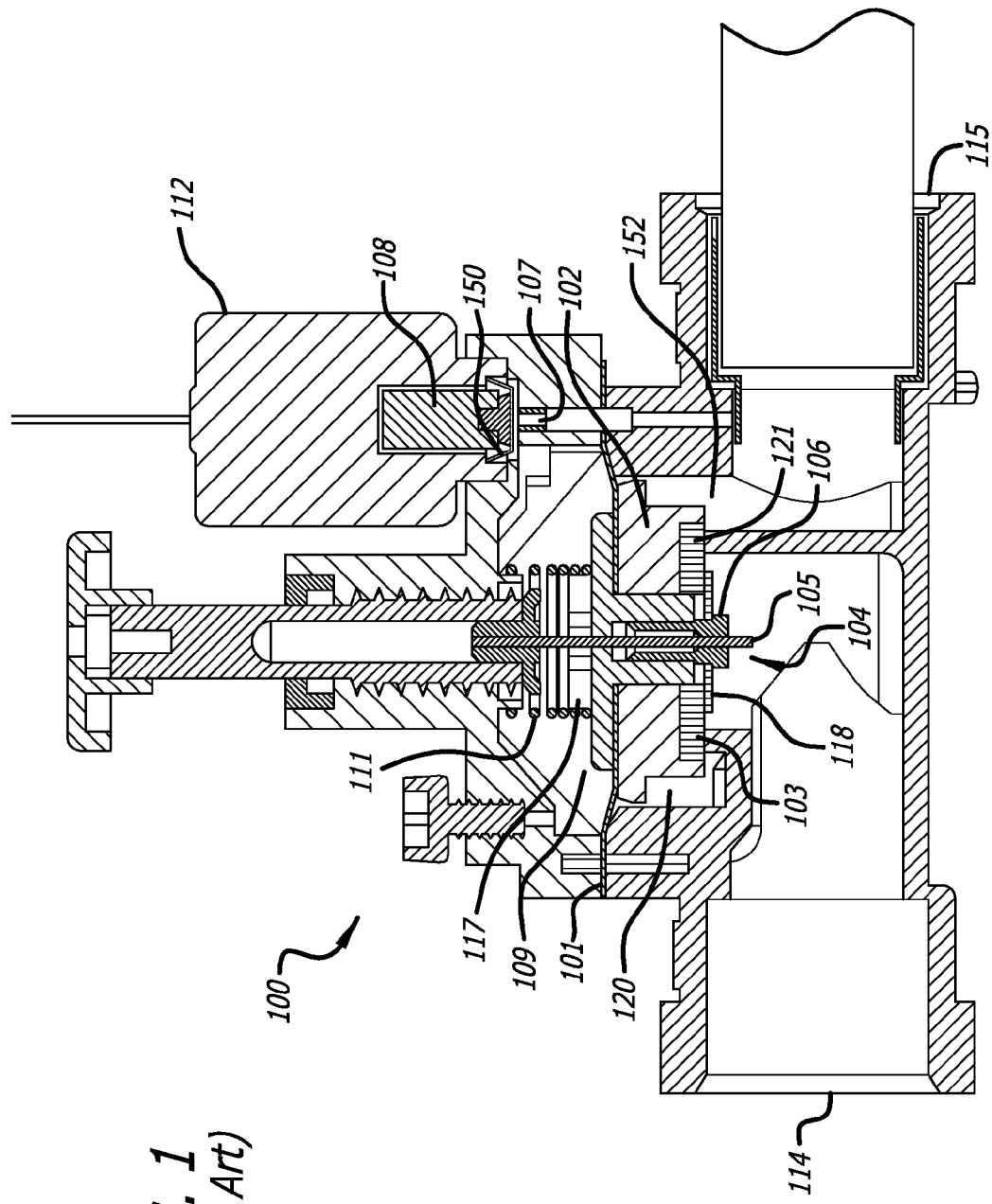
FIG. 1 illustrates a side cross sectional view of a prior art valve.

FIG. 1 illustrates a prior art irrigation valve 100 in the closed position. This irrigation valve 100 includes a water inlet port 114, a water outlet port 115, and a guide washer 102 that includes a sealing surface 103. Typically the sealing surface 103 is made from rubber or other resilient material.

The valve is actuated by a solenoid 112 that is connected to a solenoid plunger 108 which controls the opening and closing of a discharge port 107. In the closed position, the solenoid plunger 108 blocks a passage 150 that otherwise connects a diaphragm chamber 109 (located above a diaphragm 101) to the discharge port 107 and to the valve water outlet port 115.

The valve assembly seals off the diaphragm chamber 109 from the lower portion of the valve. The valve assembly 120 is made up of a diaphragm retaining cap 117 which sits over a diaphragm 101. Beneath the diaphragm sits a guide washer 102 having an inner circular channel (not shown). Retained in the guide washer 102 is a sealing surface 103. The sealing surface 103 is secured to the guide washer 102 with a valve washer 118 and metering insert 106.

The diaphragm 101 is typically composed of a resilient material with limited elongation properties such as rubber or silicone. Such elastic material allows the diaphragm to flex as the valve assembly 120 rises up to an open position and down to a closed position.

The metering pin 105 is located within the center of valve assembly 120. The clearance 104 between the metering insert 106 and metering pin 105 allows water to enter into the diaphragm chamber 109. The diameter of the metering pin 105 may be changed to let varying amounts of water into the diaphragm chamber 109, thus controlling the rate of opening and closing of the diaphragm chamber 109.

In the closed position, the water pressure in the diaphragm chamber 109 is equal to the water pressure in the valve through water inlet port 114. In contrast, the water pressure of diaphragm chamber 109 is much less than the pressure of water entering through the water inlet port 114 when the valve is set to the open position as discussed below. The pressure is lower due to the pressure drop that occurs when the water flows through the clearance 104.

In operation, a water supply is connected to water inlet port 114, and further portions of an irrigation system are connected to water outlet port 115. When the solenoid 112 is un-energized, the solenoid plunger 108 is biased to cover and seal the discharge port 107. As water enters from the water inlet port 114, it travels through the clearance 104 of the metering insert 106, into the diaphragm chamber 109. Simultaneously, due to losses resulting from flow of water, the pressure of the inlet port 114 drops while passing between the seal surface 103 and valve seat 121, causing an annular area of low pressure 152, which helps the diaphragm assembly 120 to move downwards. Pressure builds within the diaphragm chamber 109 until it approaches equalization with the water pressure coming in from water inlet port 114. Typical inlet pressure is about 60 psi. With the help of the spring 111, the diaphragm assembly continues downwards until the sealing surface 103 makes contact with the valve seat 121.

In the shut position, the pressure within the diaphragm chamber 109 is equal to the pressure of the inlet 114, but the overall force on the diaphragm assembly 120 is downwards. This is due to the fact that the pressure in the diaphragm chamber 109 is exerting its effect over a larger surface area of the diaphragm assembly 120, than the pressure in the inlet 114. This downward resultant force prevents the diaphragm assembly 120 from being pushed up from the water pressure of the inlet 114. As a result, the sealing surface 103 of the diaphragm assembly 120 remains seated on the valve seat 121, preventing passage of the inlet water through the valve.

When the solenoid 112 is energized, the solenoid plunger 108 lifts and thus allows water from the diaphragm chamber 109 to pass through the discharge port 107 and out to the water outlet port 115. The open discharge port 107 thus causes pressure in the diaphragm chamber 109 to drop. As a result, the water from the water inlet port 114 pushes up on the valve assembly 120, which compresses valve spring 111 and unseats the sealing surface 103 from the valve seat 121. With the valve pushed upwards, away from its valve seat 121, water may pass from the water inlet port 114, through valve 100, and out water outlet port 115.

During operation of the valve 100, dirt, corrosion, algae, and other debris can clog up clearance 104, preventing the diaphragm chamber 109 from filling with water. In this respect, the valve 100 is unable to close since pressure is unable to build up in the diaphragm chamber 109.

Figure 2:
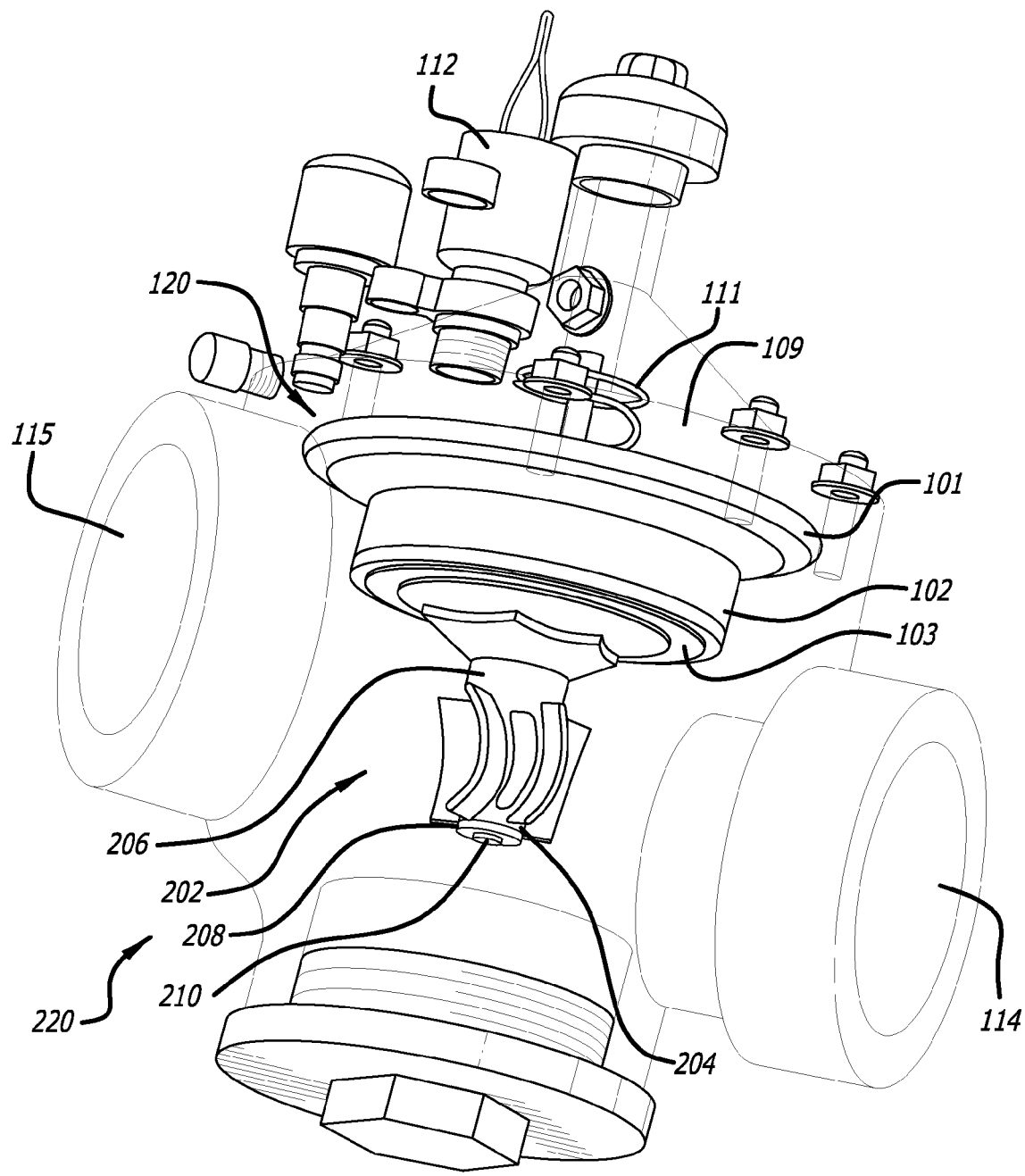
FIG. 2 illustrates a perspective view of a self cleaning valve according to a preferred embodiment of the present invention.

FIG. 2 illustrates a preferred embodiment of a debris-resistant, self-cleaning valve 200 according to the present invention. The valve 200 includes a scraping assembly 202 that includes a rotor 204 that rotates when water flows through the valve 200. As the rotor 204 rotates, it scrapes debris off of the surface of the filter 212, thereby allowing water to flow into the diaphragm chamber 109 and operate as designed.

As seen in FIG. 2, the scraper assembly 202 is on an underside of the sealing surface 103 and guide washer 102. Further, the scraper assembly 202 is screwed on to a threaded fixture located around the metering pin 105 (not shown in this figure).

Figure 3:
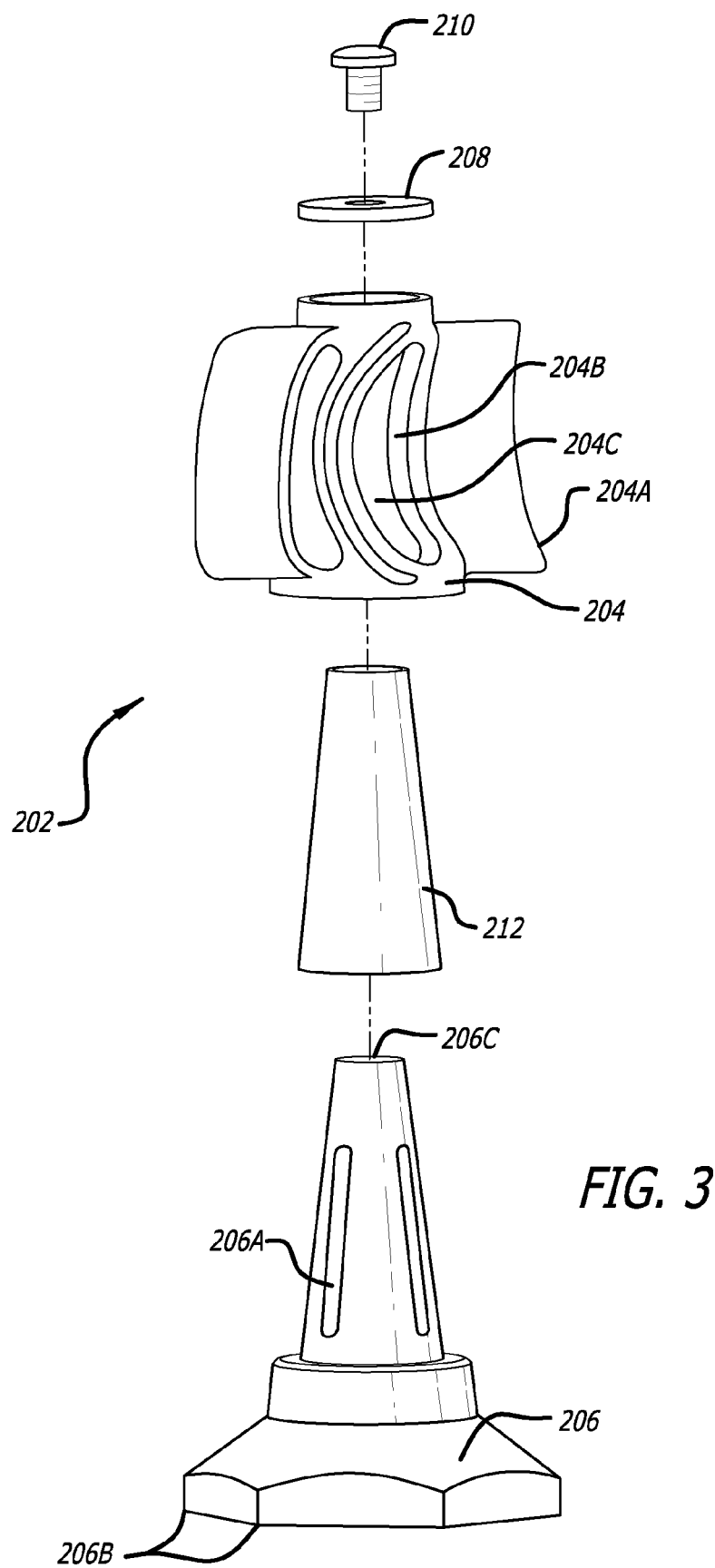
FIG. 3 illustrates a side exploded view of a filter scraping assembly according to a preferred embodiment of the present invention.

FIG. 3 illustrates an exploded view of the scraper assembly 202, comprising a base member 206, a filter 212 that is positioned over the base member, the rotor 204 that is positioned over the filter 212, a washer 208 and a screw 210. The screw 210 is screwed into a top aperture of the base member 206, pressing on the washer 208 and maintaining the rotor 204 and filter 212 in place over the base member 206. However, this arrangement provides a small gap or "play" between the rotor 204 and the base 206 so that the rotor 204 can rotate freely.

Figure 4:
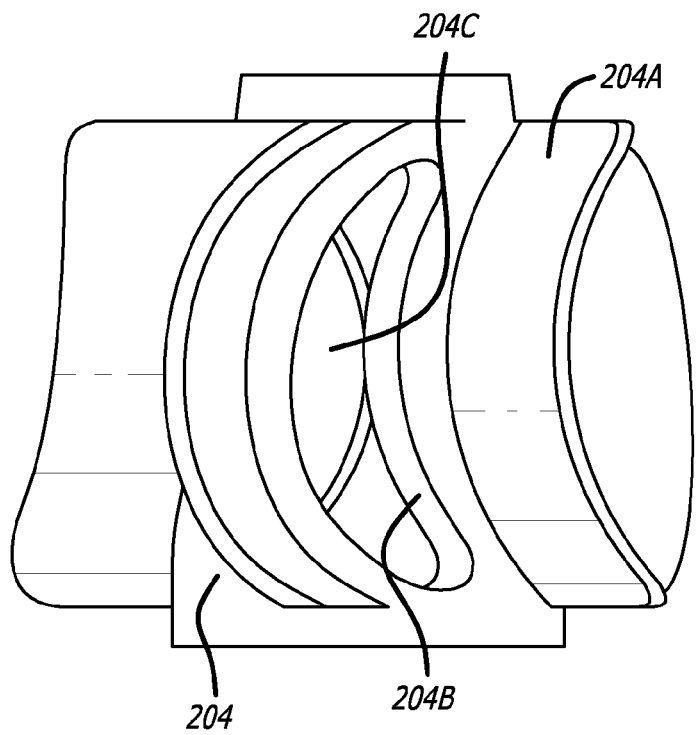
FIG. 4 illustrates a side view of a rotor according to a preferred embodiment of the present invention.
Figure 5:
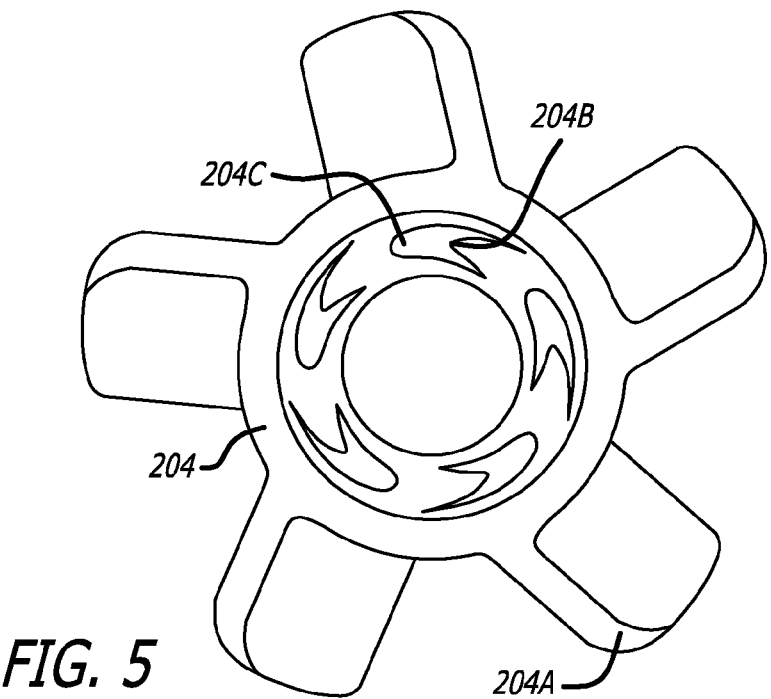
FIG. 5 illustrates an end view of the rotor of FIG. 4.
Figure 6:
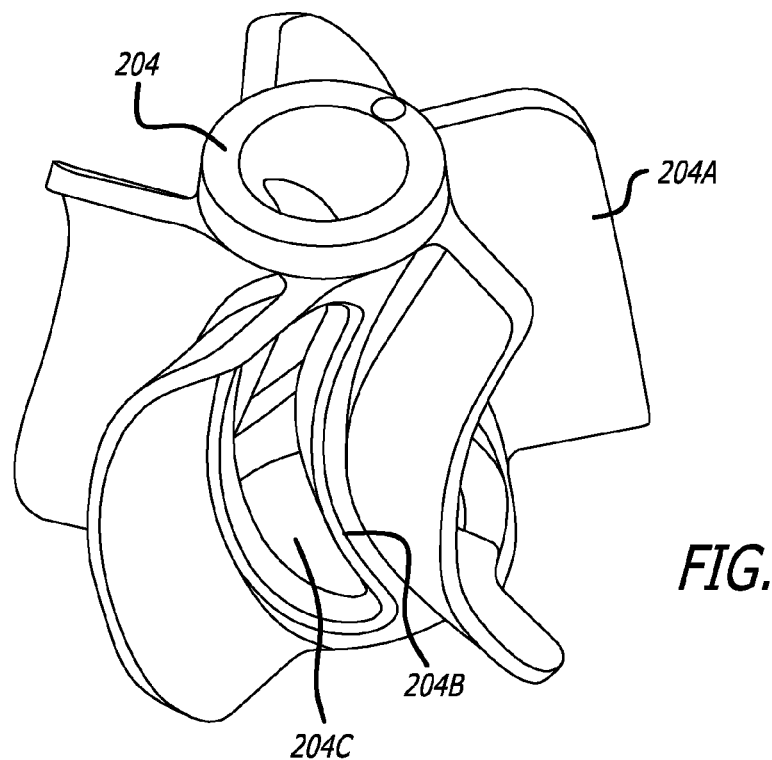
FIG. 6 illustrates a perspective view of the rotor of FIG. 4.

FIGS. 4-6 illustrate various views of the rotor 204 according to the present invention. The rotor 204 is generally cylindrical in shape, having a plurality of curved fins 204A which are pushed by incoming water, thereby rotating the rotor 204. The rotor 204 also includes curved apertures 204C along its side which allow water to pass through.

The apertures 204C include a surface 204B angled to remove debris from the filter 212. Preferably, the surface 204B has an angle within the range of about 90 degrees or more relative to the surface of the filter 212 (i.e., a line tangent to the surface of the filter 212). More preferably, the surface angle is about 100 degrees. The surface 204B also preferably includes a generally curved shape along a longitudinal axis of the rotor 204 and preferably curved in the same direction as the fins 204A. In this respect, the curve of the surface 204B tends to push debris either upwards or downwards (i.e., longitudinally), minimizing debris buildup on the rotor 204.

Preferably, the surface 204B extends along the entire longitudinal length (i.e. height) of the filter 212 or at least a substantial portion thereof. Thus, the surface 204B is able to clean most or all of the openings of the filter 212 with each rotation of the rotor 204.

Preferably, the filter 212 includes apertures or holes sized to block debris that would otherwise clog the metering passage 104. In other words, the apertures of the filter 212 are preferably sized smaller than a width of the metering passage 104.

Figure 7:
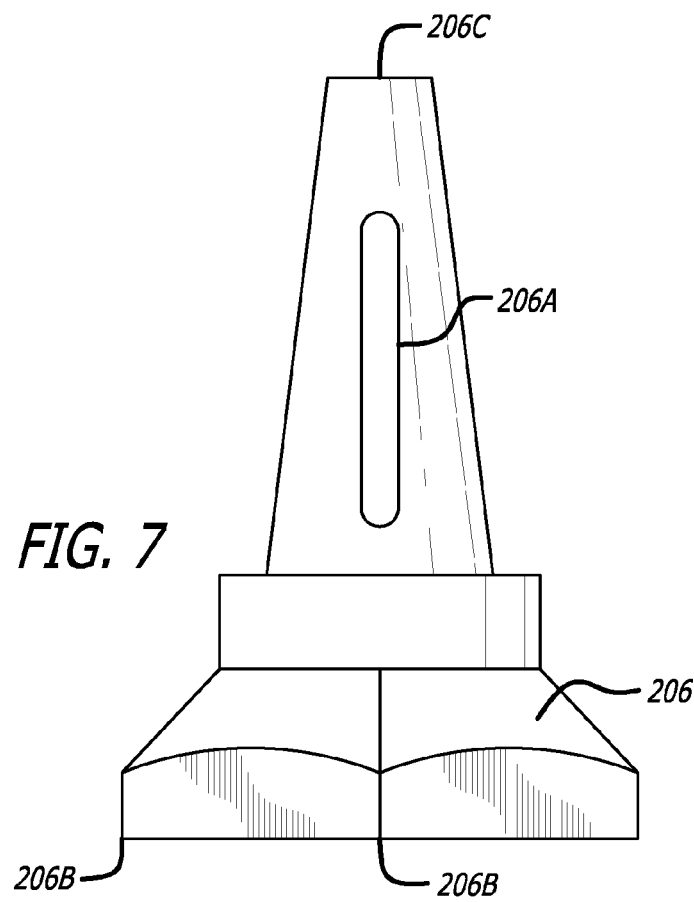
FIG. 7 illustrates a side view of a base member according to a preferred embodiment of the present invention.
Figure 8:
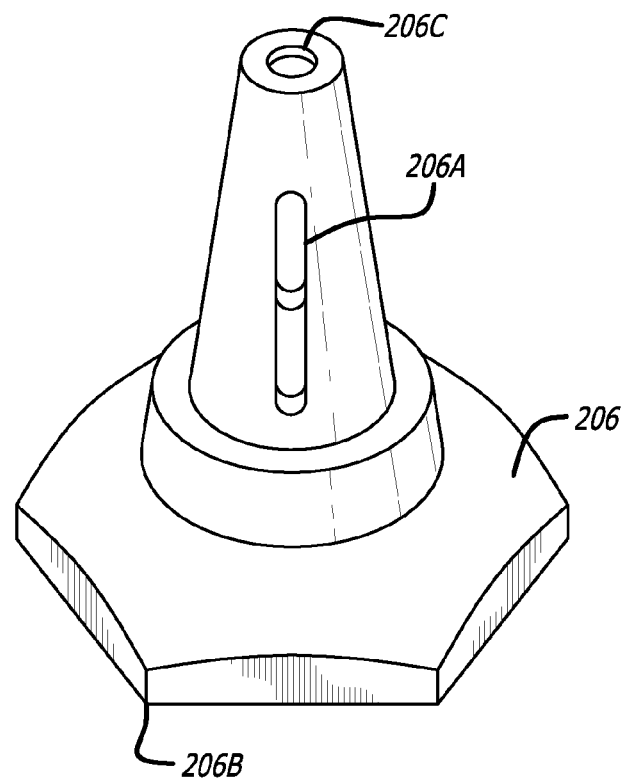
FIG. 8 illustrates a perspective view of the base member of FIG. 7.
Figure 9:
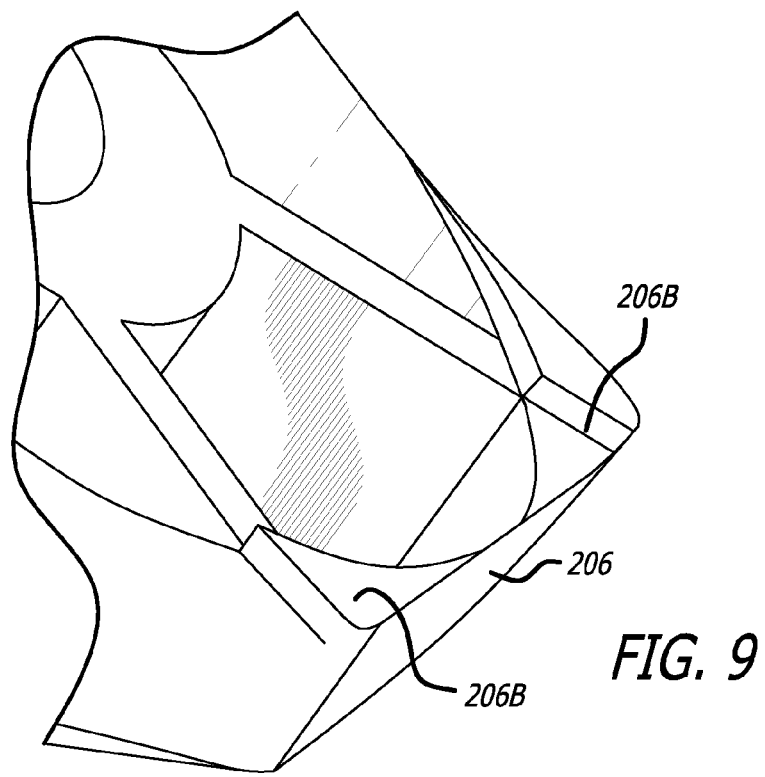
FIG. 9 illustrates a magnified view of the base member of FIG. 7.

FIGS. 7-9 illustrate the base 206 which allows access to the metering passage through elongated apertures 206A. As best seen in FIG. 8, the tip of the base includes an aperture or depression 206C into which the screw 210 can be engaged with (e.g., by "self tapping" or by engaging threads within the depression 206C.

The large diameter end of the base 206 (i.e., the end opposite the depression 206C) is fixed to a region of the guide washer 102 or sealing surface 103, preferably by a mating threaded portion on the bottom of the base 206 and the valve 200. However, other engagement mechanisms are possible, such as a "snap in" arrangement, multiple screws or a bolt.

In the case of the threaded portion, the bottom of the base 206 preferably includes a plurality of ramped or stepped surfaces 206B. The stepped surfaces 206B gradually increase in height relative to the bottom surface of the vase 206, then steps down to a lower height. Thus, these surfaces 206B allow the base 206 to be easily rotated in one direction (i.e., toward the decreasing angle of the surface 206B) but resists rotation in the opposite direction (i.e., towards the step). In this respect, the thread and surfaces 206B can be configured so that the base 206 can screw onto the valve 200 but resists unscrewing.

Figure 10:
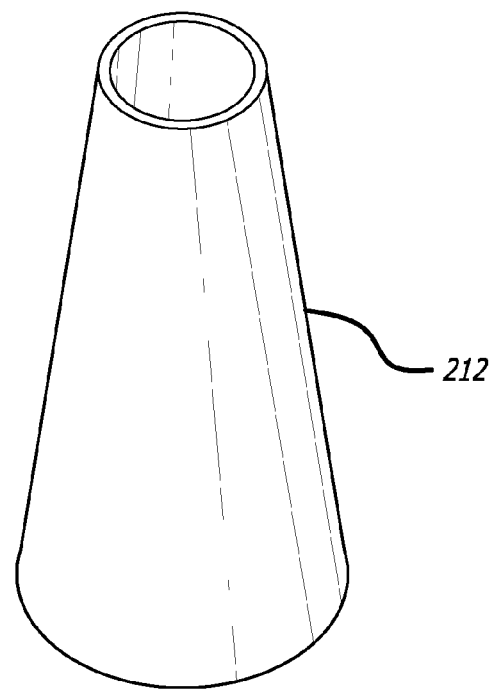
FIG. 10 illustrates a perspective view of a filter according to a preferred embodiment of the present invention.

FIG. 10 illustrates the conical shaped filter 212 that is sized to fit over the conical configuration of the base 206. The filter 212 preferably includes a plurality of holes and a generally smooth outer surface, allowing the rotor 204 to rotate around the filter 212 with a relatively small clearance. Preferably, the base 206 includes surface features on the surface of its conical section that allows the filter 212 to snap onto or frictionally maintain its position.

The scraper assembly 202 can be assembled by screwing the base 206 on to the guide washer 102, over the metering passage 104. The stepped surfaces 206B engage the sealing surface 103 so as to allow rotation of the base 206 in a tightening direction but resists rotation to loosen or unscrew the base 206. The filter 212 is then placed over the cone portion of the base 206, snapping onto raised engaging features that maintain the placement of the filter 212. The rotor 204 slides over the filter 212 so that the filter 212 is located within the center passage of the rotor 204. The washer 208 is positioned on the end surface of the rotor 204 and the screw 210 is screwed into the depression 206C of the base 206. The screw 210 is preferably tightened to maintain a relatively right clearance between the rotor 204 and the filter 212 while further allowing the rotor 204 enough clearance to spin freely.

In operation, water enters the inlet 114 of the valve 200 and passes through apertures 204, filter 212, apertures 206A and the meter passage 104, creating pressure within the upper diaphragm chamber 109. When the solenoid 112 is activated, pressure within the diaphragm chamber 109 is released, opening the valve 200. The inrush of water pushes against the fins 204A of the rotor 204, causing the rotor 204 to rotate. The surface 204B contacts any dirt, corrosion or debris on the surface of the filter 212 and pushes the debris away from the filter 212 where it can be washed out of the valve 200.

In another preferred embodiment, the surface 204B further comprises a blade that is angled near the screen 212 so as to scrap off debris as the rotor 204 rotates. The blade may be composed of metal or other hard materials and preferably includes a relatively sharp surface positioned near the screen. In this respect, the sharp nature of the blade may scrape off debris efficiently, while the hardness of the blade maintains this sharpness over time.

Figure 11:
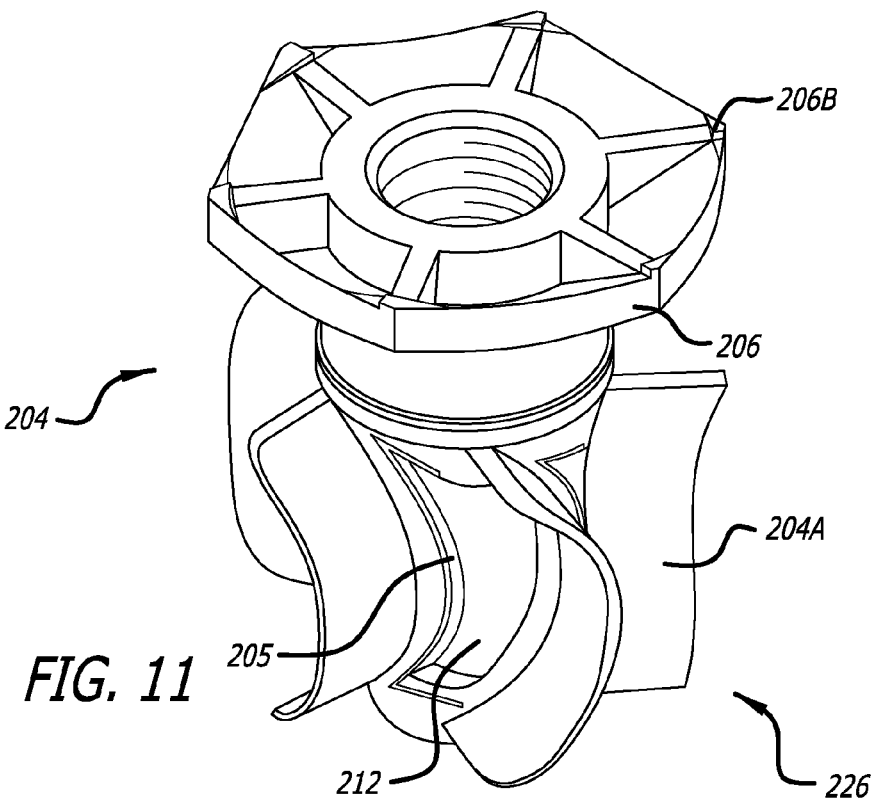
FIG. 11 illustrates a perspective view of a self cleaning filter assembly with a metal scraping surface according to a preferred embodiment of the present invention.
Figure 12:
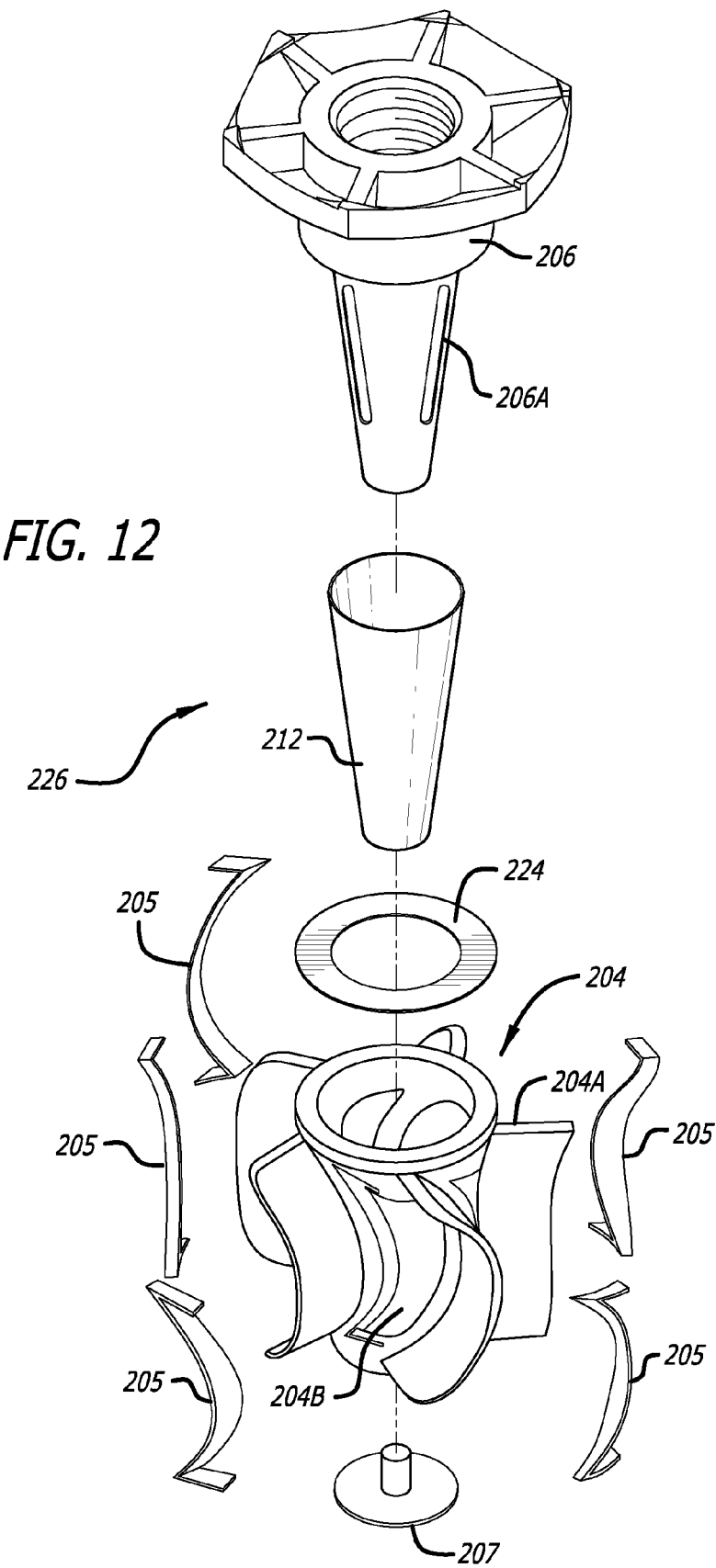
FIG. 12 illustrates an exploded view of the filter assembly of FIG. 11.

FIGS. 11 and 12 illustrate another preferred embodiment of a scraper assembly 226 that is generally similar to the previously described scraper assembly 202, but further includes reinforcement members 205, a bearing surface 224 and a screw 207.

Reinforcement members 205 fit over or are embedded into the surface 104B, providing additional strength, increased wear resistance and increased damage resistance. Preferably, the reinforcement members 205 are composed of a hard material such as metal (e.g., stainless steel), ceramic or hard polymer. Optionally, these reinforcement members 205 may be removable and therefore replaceable.

The bearing surface 224 is positioned between the base 206 and the rotor 204 to provide a surface against which the rotor 204 bears against when rotating. Preferably, the bearing surface 224 is composed of a hard material such as metal (e.g., stainless steel), ceramic or hard polymer.

The screw 207 is generally similar to the previously discussed screw 210 and washer 208. However, the wide size and shape of the screw 207 eliminates the need for the washer 208.

Figure 13:
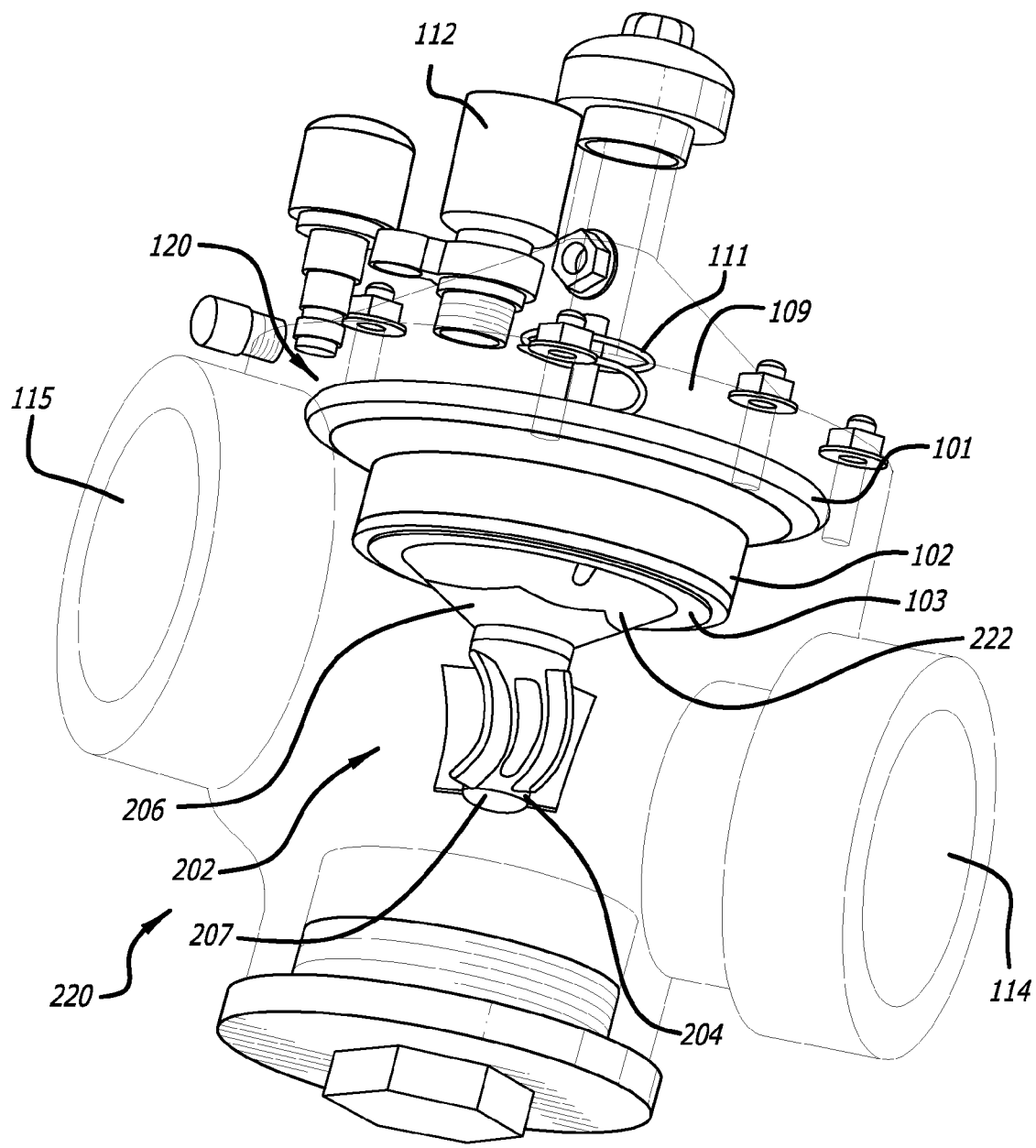
FIG. 13 illustrates a perspective view of a self cleaning filter assembly with an adapter for larger valves; and, FIG. 14 illustrates an exploded perspective view of the filter assembly of FIG. 13.
Figure 14:
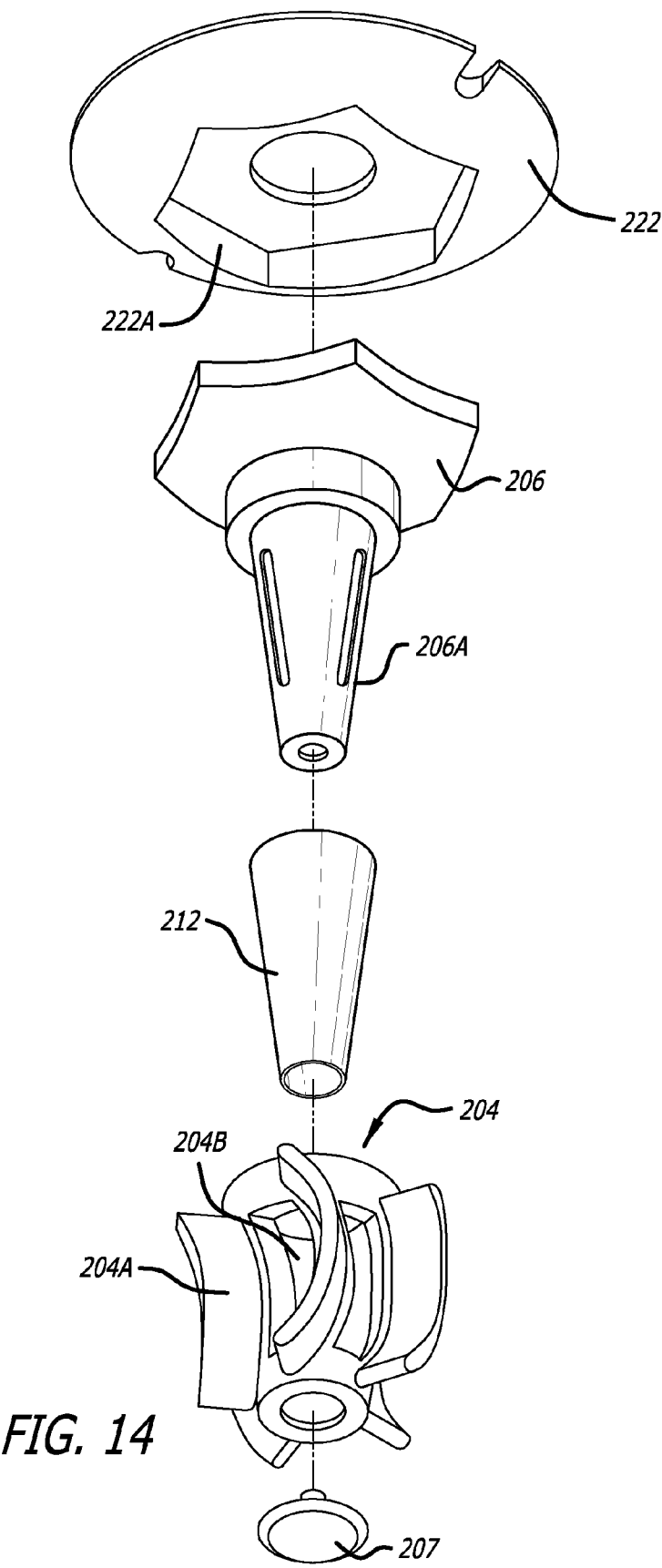

FIGS. 13 and 14 illustrate various views of a larger valve 220 with an adapter 222 for using the scraper assembly 202. As seen best in FIG. 14, the adapter preferably includes an inset area 222A that mates with a surface of base 206.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A debris tolerant valve comprising:
    a valve body having a metering passage;
    a filter covering said metering passage; said filter covering having an elongated and rounded outer filtering surface; and
    a scraping element rotatably disposed over said filter and further comprising a plurality of elongated scraping surfaces aligned to remove debris from said rounded, outer filtering surface and a plurality of laterally-attached fins positioned on an outer surface of said scraping element; said elongated scraping surfaces being curved along a longitudinal axis of said scraping element and towards a direction of rotation of said scraping element;
    wherein said scraping element is held from longitudinal movement and wherein said scraping element is rotated by passage of water through said valve body.

2. The valve of claim 1, wherein said plurality of elongated scraping surfaces are each located at the edge of one of a plurality of apertures on said scraping element.

3. The valve of claim 1, wherein said scraping element further comprises a plurality of elongated apertures each having a first side located adjacent to one of said plurality of fins and a second side located adjacent to one of said plurality of elongated scraping surfaces.

4. The valve of claim 3, wherein said scraping surfaces include an angle of about 90 degrees or greater relative to a line tangent to said filtering surface of said filter.

5. The valve of claim 4, wherein said filter surface forms a generally cylindrical shape and said scraping surfaces extend substantially entirely along a longitudinal length of said filter surface.

6. The valve of claim 5, wherein said scraping surfaces include a layer of metal.

7. The valve of claim 1, wherein said plurality of laterally-attached fins are fixed along a longitudinal length of said scraping element.

8. The valve of claim 7, wherein said scraping element further comprises a plurality of elongated and curved scraping apertures.

9. A valve comprising:
    a valve structure;
    a metering passage within said valve structure;
    a water passage selectively allowing water flow through said valve structure;
    a filter disposed over said metering passage; and
    a rotor located over at least a portion of said filter at a fixed longitudinal position; said rotor further comprising:
    a plurality of scraping elements arranged to rotate around a substantially cylindrical filter surface of said filter and are curved along a longitudinal axis of said rotor, towards a direction of rotation of said rotor; and
    a plurality of fins laterally disposed on an outer surface of said rotor;
    wherein said rotor is rotatably driven by an influx of water into said water passage and wherein rotation of said rotor removes debris from said filter surface.

10. The valve of claim 9, wherein said rotor further comprises a tubular body shape having a plurality of apertures along a side of said rotor.

11. The valve of claim 10, wherein said plurality of apertures each have an elongated shape with at least one of said plurality of scraping elements located along a longitudinal aperture edge.

12. The valve of claim 11, wherein said scraping elements are each located along a longitudinal length of one of said plurality of apertures.

13. The valve of claim 12, wherein one of said plurality of scraping elements includes an angle greater than about 90 degrees.

14. The valve of claim 13, further comprising a metal bearing surface located adjacent an end of said rotor.

15. A valve comprising:
a valve body;
a selectively closable water passage through said valve body;
a metering passage located in said valve body;
a filter disposed over said metering passage; and
a debris cleaning element having a plurality of angled surfaces that are curved along a longitudinal axis of said debris cleaning element, towards a direction of rotation of said debris cleaning element and further disposed adjacent to a surface of said filter and a plurality of fins disposed on an outer, side surface of said debris cleaning element; said debris cleaning element mounted at a fixed vertical location for rotation about an axis such that said plurality of angled surfaces circumscribe an outer, curved filter surface of said filter.

16. The valve of claim 15, wherein said valve is a solenoid-activated diaphragm-operated valve.

17. The valve of claim 16, wherein said plurality of angled surfaces comprise metal.

18. The valve of claim 17, wherein said debris cleaning element further comprises a tubular shape with an interior passage; said interior passage sized to fit over an outer surface of said filter.

* * * * *